June 20, 1944.    E. C. LEE    2,351,688
EXTRUSION APPARATUS
Filed Jan. 7, 1942
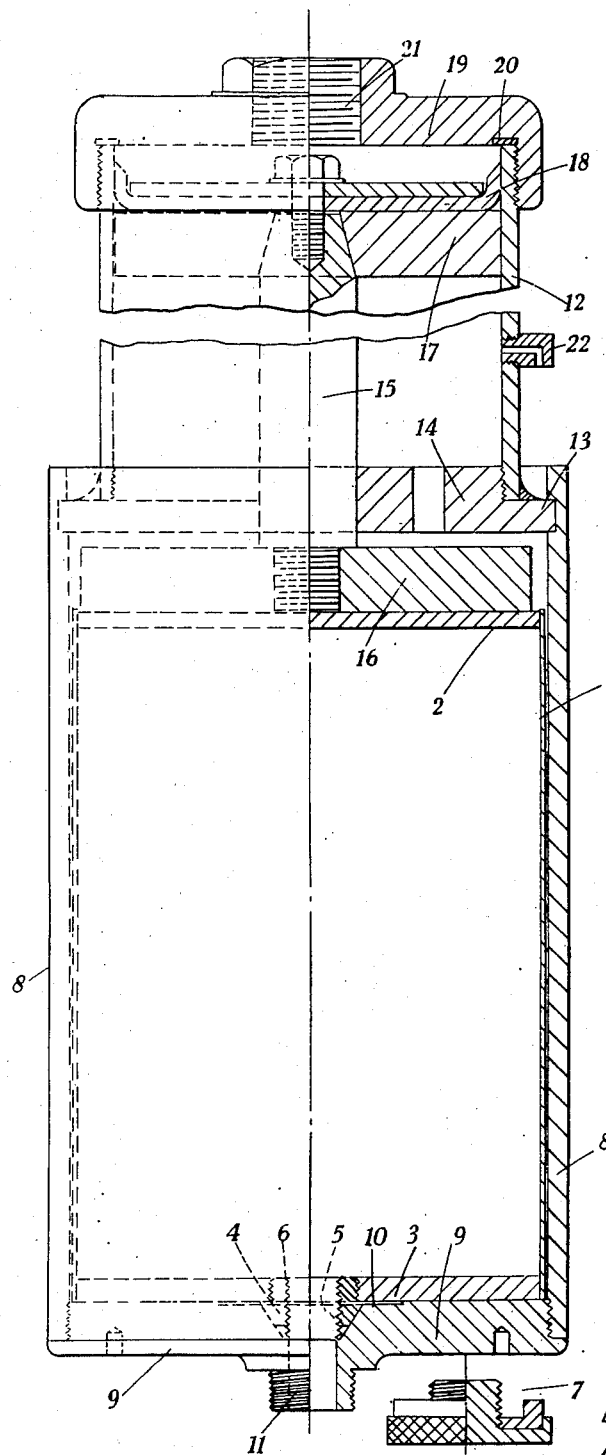
INVENTOR
E. C. Lee
BY
ATTORNEY Patented June 20, 1944

2,351,688

UNITED STATES PATENT OFFICE 2,351,688

EXTRUSION APPARATUS

Edwin Charles Lee, London, England, assignor to International Standard Electric Corporation, New York, N. Y.

Application January 7, 1942, Serial No. 425,873 In Great Britain June 18, 1940

1 Claim. (Cl. 222—327)

This invention relates to devices for the extrusion of plastic materials.

In our prior patent application No. 359,400 there is described and claimed the use of extrudable material (which is preferably plasticized polystyrene) for the cold filling of joint boxes and similar objects in electrical cable work. Such materials may have a consistency ranging from that of a table-jelly to that of a soft rubber; one such compound being used is very like chewing gum in its stiffness and tackiness. The need arises for an extruding device for forcing the material into the joint box and the present invention is directed to meeting this need.

The invention consists in an extruding device comprising an extruding cylinder adapted to receive a cartridge of plastic material, a hydraulic cylinder fixed coaxially with respect thereto, and a piston in each cylinder rigidly connected together by a piston rod.

Advantages of this invention are the provision of a convenient means of shipping and storing the styrene or like material, and the elimination of difficulties in filling the extrusion cylinder with the material.

In order that the invention may be clearly understood, a description will be given of one of its embodiments, reference being made for this purpose to the accompanying drawing which shows in elevation, half section, an extruding device loaded with a cartridge of plastic material.

The device to be described comprises a first or extruding cylinder adapted to receive with a close fit a cartridge of plastic material to be extruded from an aperture in an endwall of the cylinder. On to the opposite end there fits a second or hydraulic cylinder to which pressure fluid can be admitted to supply the motive power for the extrusion. Each cylinder contains a piston, and the two pistons are rigidly coupled by a piston rod so that movement of the hydraulic piston under the pressure of the motive fluid is imparted to the extruding piston and hence to the plastic material.

Referring to the drawing, the cartridge in which the plasticised polystyrene or other plastic material is supplied comprises a cylinder 1 of solid-drawn brass tube. One end of the tube, which for convenience may be spoken of as the rear end, is closed by a disc 2 of brass, sweated or soldered in to the tube end. The opposite or front end of the tube is closed by a disc 3 of brass, which is hard soldered in place and which is centrally apertured and fitted with a conical nipple 4 having an internal screw thread 5 and a well-rounded rear edge 6. When supplied this nipple is closed by a plug 7 which screws into the nipple and fits over the conical surface to protect it from damage: this plug 7 is removed when the cartridge is about to be inserted into the extruding cylinder.

This cartridge is received within an extruding cylinder 8, of which the front end is closed by a cap 9, centrally apertured and countersunk on the inside to receive the conical nipple 4 on the cartridge. A clearance 10 is provided around the counter-sinking to allow the end 3 of the cartridge to flex under pressure and to tighten the seating. A connection 11 leads to the joint box or the like which is to be filled with the polystyrene or other compound.

When the cartridge is in place in the extruding cylinder a hydraulic cylinder 12 is fixed onto its rear end by means of a quick locking and releasing device 13 such as a bayonet catch. Passing through the front end wall 14 of the hydraulic cylinder 12 is a piston rod 15, which carries at its front end an extruding piston 16 and at its rear end a hydraulic piston 17. The extruding piston is of a size to engage as large a surface as is practicable of the rear-end closure disc 2 of the cartridge, but at the same time small enough to clear the inside of the cannister so that it can be easily withdrawn; while the hydraulic piston is a sliding fit within its cylinder, and is provided with a pressure seal 18. The rear end of the hydraulic cylinder 12 is closed by a screw cap 19 with pressure seal 20, providing an inlet 21 from a pump which constitutes the pressure source. A leakage orifice 22 is provided near the front of the hydraulic cylinder to provide an indication when the end of the stroke has been reached.

When hydraulic pressure is applied to the piston 17 and hence to the piston 16 fitting on the top of the cartridge of styrene, the soldered joint between the rear-end cap 2 and the cartridge tube 1 is sheared through and the cap 2 moves forward with the piston 16, forcing the polystyrene compound through the nipple 4 and the connection 11 into the box to be filled.

The styrene compound, as previously indicated, may be as stiff and as sticky as chewing gum; consequently one of the problems met with, and solved by the present invention, is that of keeping the extruding device clean. In practice a worker would quite frequently find himself in the position of having used a part of a cannister of one compound and then needing to change over and use another compound. It would be a very great labour for him each time to get the piston and the side walls of an extruding device free from so stiff and tacky a material. By the use of the present invention, however, whereby each cartridge constitutes in effect its own cylinder and piston, there is no likelihood of the extruding device being fouled in this way.

What is claimed is:

An extruding device comprising an extruding cylinder having a discharge opening surrounded by a depression immediately adjacent thereto at its forward end and adapted to receive a cartridge of plastic material, said cartridge having a discharge orifice at its front end filled with a nipple registering with said opening and a movable closure at its rear end making a leak-proof contact with the inner wall of the cartridge, the portion of the front end surrounding said nipple, when under pressure upon the movement of the closure, being free to flex into the depression to tighten the seating of the nipple, a hydraulic cylinder, and a piston in each cylinder rigidly connected together by a piston rod, the piston in the hydraulic cylinder having a seal to the cylinder wall and the piston in the extruding cylinder being unsealed to the cylinder wall and adapted to abut against the closure.

EDWIN CHARLES LEE.